3,542,718
URETHANE COMPOSITIONS
Murray Lloyd Davis, Hockessin Hills, Del., and Bernardas Brizgys, Southgate, and Edward S. Mylis, Trenton, Mich., assignors to Wyandotte Chemicals Corporation, Wyandotte, Mich., a corporation of Michigan
No Drawing. Filed Aug. 15, 1966, Ser. No. 572,175
Int. Cl. C08g 37/52, 41/04
U.S. Cl. 260—31.4
22 Claims

ABSTRACT OF THE DISCLOSURE

A curable one-component polyurethane composition of matter that is stable at room temperature which constitutes a blend of (1) prepolymer having terminal hydroxyl groups which is the reaction product of
  (a) polyoxyalkylene polyol with
  (b) organic polyisocyanate,
(2) alkoxyalkylamino compound, and
(3) acid catalyst.

---

This invention relates to urethane compositions and, more particularly, to a novel curing system for polyurethane compositions.

Polyurethane compositions are usually regarded as the reaction product of a polyisocyanate and an active hydrogen-containing organic compound such as a hydroxy-terminated polyester, polyesteramine, amide or polyether.

In general, the art has developed various methods of manufacturing polyurethanes. The preparation of polyurethanes is disclosed in many references including the text entitled "Polyurethanes" by Bernard A. Dombrow, published by Reinhold Publishing Corporation, New York, N.Y. 1957, and "Polyurethanes, Chemistry and Technology" by J. H. Saunders and K. C. Frisch, published by Interscience Publishers, New York-London, wherein disclosures are made of methods for producing polyurethanes.

In the prepolymer method of manufacturing polyurethanes, the polyisocyanate in stoichiometric excess is first reacted with an active hydrogen-containing organic compound whereby a "prepolymer" is formed. The prepolymer is then reacted with active hydrogen-containing material such as water, diamines, polyethers, etc., whereupon the prepolymer polymerizes and cross-links as a result of the reaction of the excess polyisocyanate with the active hydrogen-containing material.

In the prior art it is known to produce urethane two-component coating systems wherein an isocyanate-terminated intermediate and material containing active hydrogen atoms are maintained separated until just prior to use. It is economically advantageous to prepare urethane coatings by a system wherein all components necessary are blended together prior to use. Coatings employing such a system are described as one-component systems. In general, prior art one-component urethane coating systems have been characterized by moisture instability, slow curing, pigmentation problems, and other difficulties. In order to avoid the problems of prior art one-component coating systems and the inherent difficulties of a two-component coating system, a procedure has been devised in the art for blocking the isocyanate groups. Blocking means simply a process in which the isocyanate group is reacted with a highly reactive material such as phenol. To cure such a product the blocking reaction is reversed by means of heat with evolution of phenol and liberation of free NCO groups. The use of a blocked isocyanate permits the isocyanate-terminated intermediate and a material containing active hydrogen atoms to be combined in a one-component system which is stable at room temperature. However, such one-component curing systems have the serious disadvantage of producing coatings that discolor, require a high amount of heat for curing, are toxic, expensive, are not very adherent upon many materials such as glass, and are generally unacceptable for most coating applications.

Accordingly, it is a purpose of this invention to provide a novel urethane composition and, particularly, a novel coating composition which is stable at room temperature, which is curable upon heating and which is characterized by ease of pigmentation, rapid curing, clear vehicle color, low application cost, and a high degree of adherence to many materials to which prior art urethane containing compositions do not adhere or do not adhere well.

In accordance with this invention it has been discovered that curable one-component polyurethane compositions which are stable at room temperature can be prepared which comprise (1) prepolymer having terminal hydroxyl groups which is the reaction product of
  (a) polyoxyalkylene polyol with
  (b) organic polyisocyanate, and
(2) alkoxyalkylamino compound.

It has been discovered in accordance with this invention that by blending alkoxyalkylamino compounds with hydroxy-terminated polyether-isocyanate prepolymers, the resulting compositions will remain stable at room temperature, and will cross-link by simply heating the mixture for from 1 to 30 minutes or more at a temperature of from 150 to 500° F. An acid catalyst is incorporated in this mixture to increase the conversion rate of the system. However, such catalyst has a tendency to reduce room temperature stability. Accordingly, the selection of a catalyst is dependent upon the desired amount of room temperature stability and the desired rate of conversion. Coatings produced from such compositions are highly adherent to materials such as glass and metals on which urethane coatings normally are not very adherent, even at elevated temperatures.

Alkoxyalkylamino compounds suitable for cross-linking in accordance with this invention are described in Modern Plastics Encyclopedia, 1966, pp. 131–132, published by McGraw-Hill, Inc., in a bulletin entitled "Resimene, Melamine and Urea Resins for Baking Finishes," Product Information Bulletin No. 1094, published by the Monsanto Chemical Company, Plastics Division, Springfield 2, Mass., and in a bulletin entitled "Cymel" 300, 301, published by American Cyanamid Company, Plastics and Resins Division, Wallingford, Conn.

Additional alkoxyalkylamino compounds suitable for cross-linking include alkoxyalkyl substituted guanamines, e.g., formoguanamines, benzoguanamines, acetoguanamines, stearoguanamines, etc., diguanamines, alkoxyalkyl substituted thioureas, acrylamides, benzene sulfonamides, toluene sulfonamides, etc. For purposes of this invention it is preferred that the cross-linking agents be selected from the group consisting of alkylated urea-formaldehyde compounds and alkylated melamine-formaldehyde compounds, members of which are thoroughly discussed in the above-cited references.

Alkylated urea-formaldehyde resins which may be employed include methyl, ethyl, propyl, butyl, pentyl, hexyl, heptyl, octyl, nonyl and decyl urea-formaldehyde condensates, isomers of these condensates and mixtures thereof.

Alkylated melamine-formaldehyde resins which may be employed include methyl, ethyl, propyl, butyl, pentyl, hexyl, heptyl, octyl, nonyl and decyl melamine-formaldehyde condensates, isomers of these condensates and mixtures thereof.

Additional alkylated melamine-formaldehyde compounds which may be employed include hexamethoxymethylmelamine, hexaethoxymethylmelamine, hexapropoxymethylmelamine, hexabutoxymethylmelamine, hexapentoxymethylmelamine, hexahexaoxymethylmelamine, hexaheptoxymethylmelamine, hexaoctoxymethylmelamine, hexanonoxymethylmelamine, hexadecoxymethylmelamine and mixtures thereof.

The prepolymers having terminal hydroxyl groups which may be employed in the composition of this invention are the product of the reaction of polyether polymers, also called polyoxyalkylene polyols, with organic polyisocyanates. The reaction may be carried out either by reaction of a mixture of polyether polymers and organic polyisocyanates or by the sequential reaction of polyether polymers with organic polyisocyanates.

The polyether polymers or polyoxyalkylene polyols, which can be employed in the direct, one-step process disclose herein include, for example, the oxyalkylene adducts of polyol bases wherein the oxyalkylene portion is derived from monomeric units such as ethylene oxide, propylene oxide, butylene oxide and mixtures thereof. The polyol bases include ethylene glycol, 1,2-propylene glycol, 1,3-propylene glycol, 1,2-butanediol, 1,4-butanediol, hexanetriol, glycerol, trimethylolpropane, hydroquinone, bisphenol A, pentaerythritol, alpha-methyl glucoside, sorbitol and sucrose; polyethers such as polyethylene ether glycols, polypropylene ether glycols, polytetramethylene ether glycols, and alkylene oxide adducts of polyhydric alcohols including those listed above.

Typical polyether polyols include polyoxyethylene glycol, polyoxypropylene glycol, polyoxybutylene glycol, polytetramethylene glycol, block copolymers, e.g., combinations of polyoxypropylene and polyoxyethylene glycols; poly-1,2-oxybutylene and polyoxyethylene glycols; and poly-1,4-oxybutylene and polyoxyethylene glycols; and random copolymer glycols prepared from blends, or sequential addition, of two or more alkylene oxides. Also, adducts of the above monomeric units with trimethylolpropane, glycerine, and hexanetriol as well as the polyoxypropylene adducts of higher polyols such as pentaerythritol and sorbitol may be employed. Thus, the polyether polyols which can be employed in this "one-step" process are oxyalkylene polymers which have an oxygen/carbon atom ratio from about 1:2 to 1:4 and preferably an oxygen/carbon atom ratio from about 1:2.8 to 1:4 and from about 2 to 8 terminal hydroxyl groups and preferably about 2 to 4 terminal hydroxyl groups. The polyether polyols generally have an average equivalent weight from about 30 to 5,000 and preferably have an average equivalent weight from about 100 to 1,000. Polyoxypropylene glycols having molecular weights from about 400 to 2,500 corresponding to equivalent weights from about 200 to 1,250 and mixtures thereof are particularly useful as polyol reactants. Also, polyol blends such as a mixture of high molecular weight polyether polyols can be used in preparing urethanes having good properties.

The organic isocyanates which can be employed include, for example, polymethylene diisocyanates such as tetramethylene diisocyanate and hexamethylene diisocyanate and aromatic diisocyanates such as tolylene diisocyanate, 4,4'-diphenylmethane diisocyanate, 1,5-naphthalene diisocyanate and cycloaliphatic isocyanates such as 4,4'-dicyclohexylmethane diisocyanate.

A typical example of the prepolymers having terminal hydroxyl groups which may be employed in the coating compositions of this invention is the product of a process which comprises first mixing a polyether polyol with an organic diisocyanate in the proportions to provide an OH/NCO ratio of about 8:1 to 1,000:999, inclusive, at a temperature of about 60 to 212° F., the preferred range being about 140 to 180° F. until a hydroxy-terminated prepolymer having a substantially constant viscosity is obtained.

The proportions of prepolymer and alkoxyalkylamino compound for the composition of this invention may be varied over a wide range. In general, there should be about 0.50 to 5 alkoxyalkylamino compound equivalents for each hydroxyl group of said prepolymer.

While a solvent is not essential in this composition, use of a solvent is preferred for use as a coating composition. The solvents employed in the polyurethane coating compositions of this invention should be sufficiently low boiling that they will vaporize from the composition when coated onto a surface in a thin film. Many such solvents suitable in general for urethane coatings are known in the art, for example, water, butane, 2-ethoxyethylacetate, methoxyethylacetate, butoxybutylacetate, toluene, xylene, amyl acetate, other similar esters, ketones, chlorinated solvents, nitroaliphatic solvents, dioxane and the like. The proportion of the solvent may be varied over a wide range. In some instances, no solvent is used where a viscous composition is required. Generally, a composition containing about 90 weight percent solids, based on the weight of the over-all composition, is a reasonable maximum considering that above this concentration the composition becomes very viscous or is a solid and becomes difficult to apply for coating purposes. The practical lower limit is about 5 weight percent solids. Below this an unnecessary quantity of solvent is used and coating films formed from lower concentrations are quite thin.

The amount of catalyst generally corresponds to about 0.001 to 5.0% of the combined weight of prepolymer and the alkoxyalkylamino compound. A preferred catalyst is paratoluenesulfonic acid. Other catalysts which may be employed in this invention include xylene sulfonic acid, ortho and metatoluene sulfonic acids, ethyl acid phosphate, n-butyl phosphoric acid, inorganic acids such as $H_3PO_4$, HCl, etc., ammonium chloride or sulfate, acetyl chloride, propionyl chloride, benzoyl chloride, adipyl chloride and organic acids.

In addition to the principal components, other additives or ingredients which may be used in the formulation in order to impart special properties to elastomers and coatings include fillers, extenders, pigments and dyes. This invention has the advantage that normal pigmentation methods are applicable, whereas special procedures are generally necessary in prior art one-component urethane coating systems.

The hydroxy-terminated prepolymer and amino compound are mixed in the proportions set forth above, generally at room temperature. This mixture may be stored almost indefinitely at room temperature and when it is desired to cross-link or cure, it is then heated to a temperature of 150 to 500° F.

A coating process embodying the principles of this invention comprises applying the polyurethane coating compositions presently described to various surfaces by conventional means, such as brushing, spraying, dipping, or coating with a doctor blade. The amount of time needed to cure the coatings will vary with the temperature and the amount of catalyst which is in contact with it. The coating is cured after application to the surface by heating to 150–500° F. When stored in normal paint containers, the application properties of the composition can remain satisfactory for periods exceeding six months.

The following examples are presented to illustrate the invention.

EXAMPLE I

To a dry, clean, nitrogen-filled reactor, 968.4 grams of a polyol, indicated herein as polyol No. 1, is charged. Polyol No. 1 is a polyoxypropylene adduct of bisphenol A having a molecular weight of 5.12. 0.25 cc. of a lead octoate solution containing 24% by weight of lead and 268 grams of toluene are then added.

A blend of 278.4 grams of tolylene diisocyanate and 268 grams of xylene is slowly added at a rate sufficient to maintain the temperature due to the exothermic reaction at 140° F. or less. After the exothermic reaction is finished, the contents are heated to 160° F. and held for one hour at that temperature after which the material is cooled producing a hydroxy-terminated prepolymer.

4.2 parts by weight of hexamethoxymethylmelamine are then added to 100 parts by weight of the hydroxy-terminated prepolymer along with 0.04 part by weight of para-toluenesulfonic acid. This product is diluted with 40 parts by weight of Cellosolve acetate to produce a mixture containing 50% solids by weight which is poured into a clean paint can. This mixture has a pot life of at least 120 days at room temperature and a viscosity in poises at 76° F. of 9.0.

The material is cast on glass to a thickness of approximately 7 mils wet which results in a thickness of about 2 mils when dry. The material is cured for 2 minutes at 300° F. A sample for testing is obtained by immersing the coated glass in water for 72 hours after which a sufficient amount of coating is removed for testing although such removal is difficult. Tensile tests are in accordance with ASTM designation D–882–64T with a jaw speed of 2 inches per minute. The cured coating is subjected to split tear measurements in accordance with ASTM designation D–1938–62T. The cured coating on glass is tested for hardness by the Sward method using a Sward hardness rocker, MO–OELC No. 898, described in Scientific Instrument and Apparatus Catalog No. 62, published by Gardner Laboratories, Bethesda, Md. A cured coating, 3 mils average thickness on steel panels, is subjected to Taber Abrasion Resistance Tests using a CS–17 wheel according to ASTM designation D–1044–56. Results of the above tests are indicated in Table I below.

TABLE I

| | |
|---|---|
| Tensile strength, p.s.i. | 7530 |
| Elongation, percent | 3 |
| Hardness, Sward | 50 |
| Split tear, pi | 14.6 |
| Taber abrasion resistance (milligrams lost per thousand cycles) | 18.1 |

EXAMPLE II

To a dry, clean, nitrogen-filled reactor, 512 grams of the above-described polyol No. 1 and 478.8 grams of a polyol, referred to herein as polyol No. 3, were charged. Polyol No. 3 is a polyoxypropylene glycol having a molecular weight of 766. 268 grams of toluene and 0.23 cc. of a lead octoate solution containing 24% by weight of lead are then added.

A blend of 261 grams of tolylene diisocyanate and 268 grams of xylene are added at a rate sufficiently slow to maintain the temperature below 140° F. After the exothermic reaction is finished, the contents are heated to 160° F. and held for one hour producing the hydroxy-terminated prepolymer.

4.2 parts by weight of hexamethoxymethylmelamine are then added to 100 parts by weight of the hydroxy-terminated prepolymer along with 0.04 part by weight of para-toluenesulfonic acid. This is diluted with 40 parts by weight of Cellosolve acetate to produce a mixture containing 50% solids by weight which is poured into a clean paint can. The pot life is at least 120 days at room temperature and the viscosity in poises at 76° F. is 10. The cured coating is elastomeric and adherent. The material is coated on glass and steel substrates. While the material is extremely difficult to remove even after soaking the material coated on glass for 72 hours in water, it is possible with difficulty to peel a portion of film from the glass sufficient for tensile and tear tests by the methods set forth in Example I. Additional physical properties are also determined by the methods set forth in Example I and the results are shown in Table II below.

TABLE II

| | |
|---|---|
| Tensile strength, p.s.i. | 2680 |
| 100% modulus, p.s.i. | 310 |
| Elongation, percent | 428 |
| Elongation set, percent | 2 |
| Hardness, Sward | 8 |
| Split tear, pi | 99.4 |
| Taber abrasion resistance | 0.6 |

EXAMPLE III

The prepolymer batches are prepared by charging 268.4 grams of toluene and 0.16 cc. of dibutyltin dilaurate to a dry, clean, nitrogen-filled reactor. 666 grams of a polyol, referred to herein as polyol No. 2, are then added to one batch while a mixture of 532.8 grams of polyol No. 2 with 119.6 grams of a polyol, referred to herein as polyol No. 4, is charged to the second batch. Polyol No. 2 is a polyoxypropylene adduct of bisphenol A having a molecular weight of 666. Polyol No. 4 is an adduct of polyoxypropylene with pentaerythritol having a molecular weight of 598. A blend of 139 grams of tolylene diisocyanate and 263.8 grams of xylene is added to each batch at a rate sufficiently slow to prevent temperature increase above 140° F. After the exothermic reaction is completed, the contents are heated to 160° F. and held at this temperature for one hour producing a hydroxy-terminated prepolymer. The prepolymer prepared from the batch employing polyol No. 2 alone will be referred to herein as prepolymer A while the prepolymer prepared from a mixture of polyol No. 2 and polyol No. 4 will be referred to herein as prepolymer B. A series of six compositions is then prepared from these two prepolymers by adding, respectively, 6, 10 and 14 parts by weight of hexamethoxymethylmelamine along with 0.03 part by weight para-toluenesulfonic acid to 100 parts by weight portions of each prepolymer. Each mixture is poured into a clean paint can. The pot life is at least 120 days at room temperature.

The direct and indirect impact resistance of the material of each of these six compositions in terms of inch-pounds, after coating an average of 5 mils thickness on aluminum panels 25 mils thick and curing at 300° F. for periods of time of 15, 30, 45 and 60 minutes, is determined with a Gardner Impact Tester, IG–1120, described in Scientific Instrument and Apparatus Catalog No. 62 previously cited. In all cases for all six compositions the direct impact resistance in inch-pounds is 60 or greater.

EXAMPLE IV

A series of six coating solutions is prepared by the procedure of Example III, using the same hydroxy-terminated prepolymers as in Example III, and hexamethoxymethylmelamine in proportions of 6 parts by weight hexamethoxymethylmelamine and 100 parts by weight of the prepolymer. Three compositions using prepolymer A and three compositions using prepolymer B are prepared with different amounts of para-toluenesulfonic acid employed with each prepolymer, i.e., 0.5, 1.0 and 2.0% by weight based on the amount of hexamethoxymethylmelamine. Direct impact resistances were determined as in Example III and in all cases they exceeded 60. Coated metal samples were sheared with no loss of adhesion. Additional physical properties are determined by the methods set forth in Example I and are shown in Table III below.

TABLE III

| Formulation | Composition No. | | | | | |
|---|---|---|---|---|---|---|
| | 1 | 2 | 3 | 4 | 5 | 6 |
| Cross-linking agent, parts by weight | 6 | 6 | 6 | 6 | 6 | 6 |
| Polyol No. 2/TDI adduct, parts by weight | 100 | | 100 | | 100 | |
| Polyol No. 2/Polyol No. 4/TDI adduct, parts by weight | | 100 | | 100 | | 100 |
| p-Toluenesulfonic acid, percent on hexamethoxymethylmelamine | 0.5 | 0.5 | 1.0 | 1.0 | 2.0 | 2.0 |
| Properties: | | | | | | |
| Tensile strength, p.s.i. | 2,955 | | 4,238 | | 2,230 | |
| Yield tensile, p.s.i. | 1,452 | | 1,068 | | 452 | |
| 100% modulus, p.s.i. | 1,583 | | 1,164 | | 1,022 | |
| Elongation, percent | 158 | | 210 | | 167 | |
| Elongation at yield, percent | 6 | | 5 | | 5 | |
| Elongation set, percent | 2 | | 2 | | 1 | |
| Hardness, Sward | 18 | | 16 | | 12 | |
| Split tear, pi | 20 | | 15 | | 11 | |
| Fade-Ometer 100 hours Hunter Reflectometer values | 2.8 | | 2.6 | | 2.3 | |

Compositions Nos. 1, 3 and 5 were employed for a viscosity study using the bubble-type apparatus described in the above-cited Scientific Instrument and Apparatus Catalog No. 62.

The results of the viscosity study are converted to poises and are shown in Table IV below.

TABLE IV

| Composition No. | Control | After 2 days | | After 6 days | | After 9 days | | After 13 days | | After 20 days | | 3 months | |
|---|---|---|---|---|---|---|---|---|---|---|---|---|---|
| | | R.T. | 120° F. | R.T. | 120° F. | R.T. | 120° F. | R.T. | 120° F. | R.T. | 120° F. | R.T. | 120° F. |
| 1 | 3.2 | 3.2 | 3.4 | 3.3 | 3.7 | 3.3 | 3.7 | 3.6 | 4.2 | 3.3 | 4.2 | 2.9 | 7.0 |
| 3 | 2.3 | 2.3 | | 2.4 | | 2.5 | | 2.8 | | 2.5 | | 2.1 | |
| 5 | 2.5 | 2.5 | 3.0 | 2.8 | 3.0 | 2.8 | 3.2 | 3.0 | 3.6 | 2.9 | 3.7 | 2.4 | 30.0 |

EXAMPLE V

A series of coating compositions is prepared by the procedure of Example III from one of the hydroxy-terminated prepolymers of Example III and the components are in the proportions shown in Table V below. Physical properties are determined as in Example I. This example demonstrates the superiority of the coating composition of this invention employing the hexamethoxymethylmelamine type cross-linkers (composition No. 4) over compositions using the same hydroxy-terminated prepolymers employing the polyol-TDI prepolymer cross-linker. The prepolymer cross-linker is prepared from one mole of a polyoxypropylene-trimethylolpropane triol adduct having a molecular weight of 426, referred to herein as polyol No. 5, and 3.15 moles of TDI. The materials are reacted at 180° F. until a free NCO content of approximately 7.1% is obtained. The coating composition No. 4 when coated on glass after soaking for 72 hours in water could be removed only with difficulty, whereas compositions Nos. 1–3 which did not employ the hexamethoxymethylmelamine cross-linker could be removed with substantial ease after only one hour in water.

TABLE V

| Formulation | Composition No. | | | |
|---|---|---|---|---|
| | 1 | 2 | 3 | 4 |
| Hexamethoxymethylmelamine, parts by weight | | | | 6 |
| Polyol No. 2/TDI prepolymer, parts by weight | 200 | 200 | 200 | 100 |
| Polyol No. 5/TDI prepolymer, 7.1% free NCO, parts by weight | 38.4 | 20.8 | 14.3 | |
| Solids, weight percent | 50 | 50 | 50 | 40 |
| p-Toluenesulfonic acid, wt. percent | | | | 2.0 |
| Properties: | | | | |
| Tensile strength, p.s.i. | 6,345 | 5,747 | 4,912 | 9,347 |
| Elongation, percent | 25 | 28 | 3 | 5 |
| Hardness, Sward | 60 | 52 | 48 | 54 |
| Split tear, pi | 4 | 13 | 19 | 11 |
| Pot life, hrs. | 85 | 144 | 156 | (¹) |
| Color change after 100 hrs. Fade-Ometer exposure Hunter Reflectometer values | 2.2 | 2.5 | 2.4 | 0.2 |

¹ More than 10 days.

EXAMPLE VI

A series of coating compositions is prepared by the procedure of Example I from the hydroxy-terminated prepolymers shown in Table VI below, cross-linked with hexamethoxymethylmelamine. Additional components and proportions are shown in Table VI below along with the physical properties. Methods for determining properties are described in previous examples. Compositions Nos. 1 and 2 illustrate the pigmentation of the coating composition of this invention. Composition No. 3 illustrates the use of a blend of different hydroxy-terminated prepolymers in coating compositions prepared according to the instant invention.

TABLE VI

| Formulation | Composition No. | | |
|---|---|---|---|
| | 1 | 2 | 3 |
| Polyol No. 1/Polyol No. 3/TDI adduct, 16/10/24 eq. | | | 50 |
| Polyol No. 1/TDI prepolymer, 10/8 eq.+TiO₂ ¹ | 60 | 60 | |
| Polyol No. 1/TDI prepolymer | ² 30 | | ³ 50 |
| Polyol No. 2/TDI prepolymer, 10/8 eq. | | 30 | |
| Hexamethoxymethylmelamine, percent on solids | 6 | 6 | 6 |
| p-Toluenesulfonic acid, percent on cross-linking agent | 1 | 1 | 1 |
| Cellosolve acetate | 58 | 58 | |
| Percent solids by weight | 50 | 50 | 40 |
| Cure time, min. at 300° F | 30 | 30 | 30 |
| Tensile strength, p.s.i. | 7,787 | 7,428 | 2,950 |
| Yield tensile, p.s.i. | | | 3,300 |
| 100% modulus, p.s.i. | | | 2,300 |
| Elongation, percent | 4.3 | 4.2 | 14.6 |
| Elongation at yield, percent | | | 5 |
| Hardness, Sward | 40 | 46 | 34 |
| Split tear, pi | 18.1 | 18.7 | 15 |
| Taber abrasion, mg. loss/1,000 cycles | 29.7 | 31.2 | |
| Direct impact resistance, inch-lbs. on steel | 140 | >160 | (⁴) |
| Indirect impact resistance, inch-lbs. on steel | >160 | >160 | (⁴) |
| Pot life, days | >30 | >30 | |
| Fade-Ometer 100 hours Hunter Reflectometer values | 2.6 | 5.3 | 6.2 |
| Weather-Ometer 100 hours Hunter Reflectometer values | 1.5 | 4.6 | |

¹ Proportions by weight prepolymer/TiO₂ is 100/30.
² 10/8 eq.
³ 18/16 eq.
⁴ 60 al. panels.

EXAMPLE VII

A coating composition is prepared by mixing 694 grams of the hydroxy-terminated prepolymer of Example II with 58.3 grams of a toluene solution containing 50% by weight hexamethoxymethylmelamine and 3.31 cc. of a toluene solution containing 10% by weight para-toluenesulfonic acid. 100 parts by weight of this composition is mixed with 110 parts by weight of a water-surfactant solution containing 5% by weight of surfactant. The surfactant is a polyoxyethylene-polyoxypropylene block polymer glycol having a molecular weight of 13,000. The material is coated on glass and steel and cured for 15 minutes at 300° F. The films cannot be removed intact from the substrates even after soaking in hot water for more than 3 hours. The film is an elastomeric film. This example demonstrates that excellent water emulsions can be prepared from the compositions of the instant invention.

EXAMPLE VIII

This sample illustrates the preparation of the composition of the instant invention wherein essentially no solvent is employed. A coating composition is prepared by the procedure of Example I from a hydroxy-terminated prepolymer prepared by the reaction of a polyoxypropylene glycol having a molecular weight of 2,000, hereinafter referred to as polyol No. 6, with TDI in molar proportions of polyol to TDI of 6:5. This prepolymer is mixed with hexamethoxymethylmelamine and a toluene solution containing 10% by weight para-toluenesulfonic acid in proportions of 100 parts by weight of the hydroxy-terminated prepolymer, 3.33 parts by weight of the hexamethoxymethylmelamine solution and 1 part by weight of the para-toluenesulfonic acid solution. This material is coated onto aluminum and cured for ½ hour at 300° F. A tough, tacky film is produced.

EXAMPLE IX

A coating composition is prepared by the procedure of Example I. A hydroxy-terminated prepolymer solution is prepared from 6.9 parts by weight PAPI (polymethylene polyphenyl isocyanate), 93.1 parts by weight of a polyoxyethylene terminated polyoxypropylene glycol having a molecular weight of 2,174, referred to herein as polyol No. 7, 0.1 part by weight dibutyltin dilaurate, and 50 parts by weight xylene. This material is then mixed with 6 parts by weight of a toluene solution containing 50% by weight hexamethoxymethylmelamine and 0.6 part by weight of a cellosolve acetate solution containing 10% by weight para-toluenesulfonic acid. The material is coated on tin plate and cured for 15 minutes at 300° F. The coating is tack-free and unaffected by immersion in alcohol.

EXAMPLE X

A coating composition is prepared by the procedure of Example I. A hydroxy-terminated prepolymer is prepared from 15.4 parts by weight of a 30/100 mixture of TDI and MDI (diphenylmethane-4,4'-diisocyanate), 84.6 parts by weight ethylene oxide capped polyoxypropylene glycol having a molecular weight of 1,164, 0.1 part by weight dibutyltin dilaurate and 50% by weight of a 50/50 blend of xylene and toluene. This material is then mixed with 12 parts by weight of a toluene solution containing 50% by weight hexamethoxymethylmelamine resin with 0.6% by weight of cellosolve acetate solution containing 10% by weight n-butyl phosphoric acid. The material is coated on tin plate and cured for 15 minutes at 300° F. The coating is tack-free and unaffected by immersion in alcohol.

EXAMPLE XI

A series of coating compositions is prepared by the procedure of Example I wherein the hydroxy-terminated prepolymers shown in Table VII below with their weight ratios are cross-linked with butylated urea-formaldehyde resin in the proportions shown in Table VII below.

Additional components and proportions by weight of components are shown in Table VII below along with the physical properties as determined by methods previously described. The material is coated on tin-plated steel. This example illustrates the use of alkylated urea-formaldehyde resin cross-linking agents with different hydroxy-terminated prepolymers. All proportions in Table VII are in parts by weight unless otherwise indicated.

TABLE VII

| Formulation | Composition No. 1 | Composition No. 2 |
|---|---|---|
| Cross-linking agent | 9 | 9 |
| Prepolymer of Example I | 100 | |
| Polyol No. 2/Polyol No. 4/TDI Prepolymer of Example III | | 140 |
| Para-toluenesulfonic acid, percent on urea resin | 1 | 1 |
| Cellosolve acetate | 80 | 40 |
| Solids, percent weight | 40 | 40 |
| Cure time, min. at 300° F | 5 | 5 |
| Properties: | | |
| Tensile strength, p.s.i | 8,860 | 1,700 |
| 100% modulus, p.s.i | | 1,193 |
| Elongation, percent | 8 | 126 |
| Elongation set, percent | | 1 |
| Hardness, Sward | 54 | 14 |
| Split tear, pi | 13.4 | 10.6 |
| Impact resistance, inch/lbs., direct and indirect | 160 | 160 |
| Viscosity, cps. at 75° F | 4,800 | 1,200 |

EXAMPLE XII

A coating composition, substantially the same as composition No. 1 of Example XI, is prepared as described in Example XI with the exception that butylated melamine-formaldehyde resin is employed in lieu of butylated urea-formaldehyde resin and ethyl acid phosphate is employed as a catalyst in lieu of para-toluenesulfonic acid. The material produced is coated on an aluminum substrate and cured for 15 minutes at 300° F. The coating is tack-free and unaffected by immersion in alcohol.

EXAMPLE XIII

This example illustrates the production of molded reinforced plastic products from a composition embodying the principles of this invention. The liquid mixture produced by the method of Example I, i.e., the mixture which contains 50% solids by weight is poured into a dip tank containing Fiberglas roving in an amount sufficient to completely saturate the Fiberglas roving. Excess resin is then removed after which the solvent is removed by flashing. The saturated Fiberglas roving is then placed in a mold in sufficient quantity to completely fill the mold. The material in the mold is then heated and cured in a press for 5 to 15 minutes at 300° F. producing a molded, solid plastic product.

While there has been shown and described hereinabove the present preferred embodiments of this invention, it is to be understood that various changes, alterations and modifications can be made thereto without departing from the spirit and scope thereof as defined in the appended claims.

What is claimed is:
1. A new composition of matter consisting essentially of
   (1) saturated prepolymer having terminal hydroxyl groups which is the reaction product of materials consisting essentially of
      (a) polyoxyalkylene polyol with
      (b) organic polyisocyanate,
   (2) alkoxyalkylamino compound selected from the group consisting of alkylated urea-formaldehyde compounds and alkylated melamine-formaldehyde compounds, and
   (3) acid catalyst.
2. The composition of claim 1 wherein said polyoxyalkylene polyol (1)(a) has an average equivalent weight of from about 30 to 5,000, an oxygen/carbon atom ratio of from about 1:2 to 1:4 and from about 2 to 8 terminal hydroxyl groups, said polyisocyanate (1)(b) is employed in an amount to provide an OH/NCO equivalent ratio ranging from about 8:1 to 1,000:999; the ratio of respective equivalents of said alkoxyalkylamino compound (2) per hydroxyl group of said prepolymer (1) ranges from about 0.50:1 to 5:1; and the amount of said acid catalyst (3) corresponds to about 0.001 to 5.0% of the combined weight of prepolymer (1) and amino compound (2).

3. The composition of claim 2 wherein said polyoxyalkylene polyol (1)(a) has an average equivalent weight of from about 100 to 1,000, an oxygen/carbon atom ratio of from about 1:2.8 to 1:4 and from about 2 to 4 terminal hydroxyl groups.

4. The composition of claim 2 wherein said composition includes a solvent in an amount to provide a composition containing from 5 to 90% by weight of solids.

5. The composition of claim 2 wherein said polyoxyalkylene polyol (1)(a) is a polyoxypropylene adduct of bisphenol A, said organic polyisocyanate (1)(b) is tolylene diisocyanate, said alkoxyalkylamino compound is hexamethoxymethylmelamine and said composition includes a solvent in an amount to provide a composition containing from about 5 to 90% by weight of solids.

6. The composition of claim 5 wherein said catalyst is para-toluenesulfonic acid.

7. The composition of claim 6 wherein said solvent is cellosolve acetate.

8. The composition of claim 2 wherein said polyoxyalkylene polyol (1)(a) is a mixture of a polyoxypropylene adduct of bisphenol A and a polyoxypropylene glycol, said organic polyisocyanate (1)(b) is tolylene diisocyanate, said alkoxyalkylamino compound is hexamethoxymethylmelamine and said composition includes a solvent in an amount to provide a composition containing from about 5 to 90% by weight of solids.

9. The composition of claim 8 wherein said catalyst is para-tolenesulfonic acid.

10. The composition of claim 9 wherein said solvent is cellosolve acetate.

11. A new composition of matter which is the reaction product at a temperature of about 150 to 500° F. in the presence of an acid catalyst of
(1) saturated prepolymer having terminal hydroxyl groups which is the reaction product of materials consisting essentially of
    (a) polyoxyalkylene polyol with
    (b) organic polyisocyanate, and
(2) alkoxyalkylamino compound selected from the group consisting of alkylated urea-formaldehyde compounds and alkylated melamine-formaldehyde compounds.

12. The composition of claim 11 wherein said polyoxyalkylene polyol (1)(a) has an average equivalent weight of from about 30 to 5,000, an oxygen/carbon atom ratio of from about 1:2 to 1:4 and from about 2 to 8 terminal hydroxyl groups, said polyisocyanate (1)(b) is employed in an amount to provide an OH/NCO equivalent ratio ranging from about 8:1 to 1,000:999; the ratio of respective equivalents of said alkoxyalkylamino compound (2) per hydroxyl group of said prepolymer (1) ranges from about 0.50:1 to 5:1; and the amount of said acid catalyst corresponds to about 0.001 to 5.0% of the combined weight of prepolymer (1) and amino compound (2).

13. The composition of claim 12 wherein said polyoxyalkylene polyol (1)(a) has an average equivalent weight of from about 100 to 1,000, an oxygen/carbon atom ratio of from about 1:2.8 to 1:4 and from about 2 to 4 terminal hydroxyl groups.

14. The composition of claim 12 wherein said polyoxyalkylene polyol (1)(a) is a polyoxypropylene adduct of bisphenol A, said organic polyisocyanate (1)(b) is tolylene diisocyanate, and said alkoxyalkylamino compound is hexamethoxymethylmelamine.

15. The composition of claim 14 wherein said catalyst is para-toluenesulfonic acid.

16. The composition of claim 12 wherein said polyoxyalkylene polyol (1)(a) is a mixture of a polyoxypropylene adduct of bisphenol A and a polyoxypropylene glycol, said organic polyisocyanate (1)(b) is tolylene diisocyanate, and said alkoxyalkylamino compound is hexamethoxymethylmelamine.

17. The composition of claim 16 wherein said catalyst is para-toluenesulfonic acid.

18. A process for preparing a urethane composition comprising the steps of mixing:
(1) saturated prepolymer having terminal hydroxyl groups which is the reaction product of materials consisting essentially of
    (a) polyoxyalkylene polyol with
    (b) organic polyisocyanate,
(2) alkoxyalkylamino compound selected from the group consisting of alkylated urea-formaldehyde compounds and alkylated melamine-formaldehyde compounds, and
(3) acid catalyst
and heating the mixture at a temperature of 150 to 500° F.

19. The process of claim 18 wherein said polyoxyalkylene polyol (1)(a) has an average equivalent weight of from about 30 to 5,000, an oxygen/carbon atom ratio of from about 1:2 to 1:4 and from about 2 to 8 terminal hydroxyl groups, said polyisocyanate (1)(b) is employed in an amount to provide an OH/NCO equivalent ratio ranging from about 8:1 to 1,000:999; the ratio of respective equivalents of said alkoxyalkylamino compound (2) per hydroxyl group of said prepolymer (1) ranges from about 0.50:1 to 5:1; and the amount of said acid catalyst (3) corresponds to about 0.001 to 5.0% of the combined weight of prepolymer (1) and amino compound (2).

20. The process of claim 19 wherein said polyoxyalkylene polyol (1)(a) has an average equivalent weight of from about 100 to 1,000, an oxygen/carbon atom ratio of from about 1:2.8 to 1:4 and from about 2 to 4 terminal hydroxyl groups.

21. The process of claim 19 wherein a solvent is incorporated in said mixture in an amount to provide a composition containing from about 5 to 90% by weight of solids.

22. The process of claim 21 wherein said mixture is applied as a coating to a substrate and then heated at a temperature of about 150 to 500° F.

References Cited

UNITED STATES PATENTS

| | | | |
|---|---|---|---|
| 3,049,516 | 8/1962 | Damusis. | |
| 3,135,707 | 6/1964 | Nyquist et al. | 260—849 |
| 3,242,230 | 3/1966 | Habib | 260—849 |
| 3,368,988 | 2/1968 | Sekmakas | 260—849 |
| 3,384,606 | 5/1968 | Dieterich et al. | 260—849 |

OTHER REFERENCES

Martin, Chemistry of Phenolic Resins, John Wiley & Sons, New York, 1956, TP978M38, p. 234.

JOHN C. BLEUTGE, Primary Examiner

U.S. Cl. X.R.

117—126, 132, 161; 161—93, 198; 260—21, 29.2, 32.4, 32.8, 33.2, 33.6, 33.8, 39, 77.5, 847